US005482044A

United States Patent [19]
Lin et al.

[11] Patent Number: 5,482,044
[45] Date of Patent: Jan. 9, 1996

[54] DIRECT DEMODULATION IN ULTRASOUND INSTRUMENTS

[75] Inventors: Sheng-Tz Lin, Santa Clara; John P. Scheib, San Jose, both of Calif.

[73] Assignee: Diasonics Ultrasound, Inc., Milpitas, Calif.

[21] Appl. No.: 820,496

[22] Filed: Jan. 14, 1992

[51] Int. Cl.$^6$ ............................................. A61B 8/00
[52] U.S. Cl. ............................................. 128/660.07
[58] Field of Search .................... 128/660.06–660.07; 73/661.01, 625–626; 329/341–343; 341/122

[56] References Cited

U.S. PATENT DOCUMENTS

| | | | |
|---|---|---|---|
| 3,825,737 | 7/1974 | Croisier | 364/603 |
| 4,016,750 | 4/1977 | Green | 73/629 |
| 4,265,126 | 5/1981 | Papadofrongakis et al. | 73/861.25 |
| 4,387,597 | 6/1983 | Brondestini | 128/661.01 X |
| 4,506,228 | 3/1985 | Kammeyer | 329/343 |
| 4,553,437 | 11/1985 | Luthra et al. | 73/602 |
| 4,586,135 | 4/1986 | Matsumoto | 73/602 X |
| 4,604,697 | 8/1986 | Luthra et al. | 73/602 |
| 4,633,399 | 12/1986 | Stebens et al. | 364/421 |
| 4,803,700 | 2/1989 | Dewey et al. | 375/321 |
| 4,839,652 | 6/1989 | O'Donnell et al. | 341/122 |
| 4,886,069 | 12/1989 | O'Donnell | 128/661.01 |
| 4,888,557 | 12/1989 | Puckette, IV et al. | 329/341 |
| 4,902,979 | 2/1990 | Puckette, IV | 329/343 |
| 4,983,970 | 1/1991 | O'Donnell et al. | 341/122 |
| 4,984,188 | 1/1991 | Kato | 364/725 |
| 5,003,621 | 3/1991 | Gailus | 455/209 |
| 5,042,303 | 8/1991 | Geluk et al. | 73/602 |
| 5,103,427 | 4/1992 | Erdol et al. | 128/661.01 X |
| 5,111,823 | 5/1992 | Cohen | 128/660.07 |
| 5,165,413 | 11/1992 | Maslak et al. | 128/660.05 |
| 5,187,687 | 2/1993 | Burckhard et al. | 128/661.01 X |
| 5,230,340 | 7/1993 | Rhyne | 128/661.01 |
| 5,249,578 | 10/1993 | Karp et al. | 128/661.01 |
| 5,268,877 | 12/1993 | Odell | 128/661.01 X |
| 5,285,788 | 2/1994 | Arenson et al. | 128/660.07 |
| 5,293,247 | 3/1994 | Ganse | 358/328 |
| 5,301,674 | 4/1994 | Erikson et al. | 128/661.012 |
| 5,329,930 | 7/1994 | Thomas, III et al. | 128/661.012 |
| 5,415,171 | 5/1995 | Goh et al. | 128/660.07 |

Primary Examiner—Francis Jaworski
Attorney, Agent, or Firm—Blakely, Sokoloff, Taylor & Zafman

[57] ABSTRACT

A direct digital demodulator for demodulating ultrasound signals. The demodulator includes a baseband demodulator, a magnitude and differential phase generator, and a Doppler preprocessor. The demodulator further includes an interface for receiving a signal from an analog front end. The baseband demodulator utilizes a Hilbert transform to convert received ultrasound signals into analytic signals. The present invention compensates phase and frequency of the analytic signal in order to process the signal. The phase information in the signal is then extracted.

33 Claims, 5 Drawing Sheets

FIG. 1  ULTRASOUND IMAGING SYSTEM

FIG. 2  DIRECT DIGITAL DEMODULATOR

DIRECT DEMODULATION IN ULTRASOUND INSTRUMENTS

FIELD OF THE INVENTION

The present invention relates to the field of ultrasound imaging; particularly, the invention relates to an apparatus for processing ultrasonic data.

BACKGROUND OF THE INVENTION

During recent decades, ultrasonic technology has played an ever-increasing role in examining the internal structure of living organisms. The technology employed has applications in diagnosis of various medical ailments where it is useful to examine soft tissues within the body which shows structural details such as organs and blood flow. This enables medical staff to locate the portions which may indicate that disease or abnormalities are present. To examine the internal body structure, ultrasonic images are formed by producing ultrasonic waves using a transducer, passing the waves through a body, and measuring the properties of the scattered echoes (i.e., amplitude) from reflections inside the body using a receptor.

More recently, these imaging systems also detect velocity along the axis of the interrogating sound beam, along with the amplitude. Such detection can provide an image of the blood flow pattern or vessel network, which is information of high diagnostic significance. The detection of velocity is based upon the Doppler principle, whereby a change in observed frequency of the reflected echo pulse indicates a corresponding change in velocity has occurred in the region from which the echo emanates.

Figure 1:
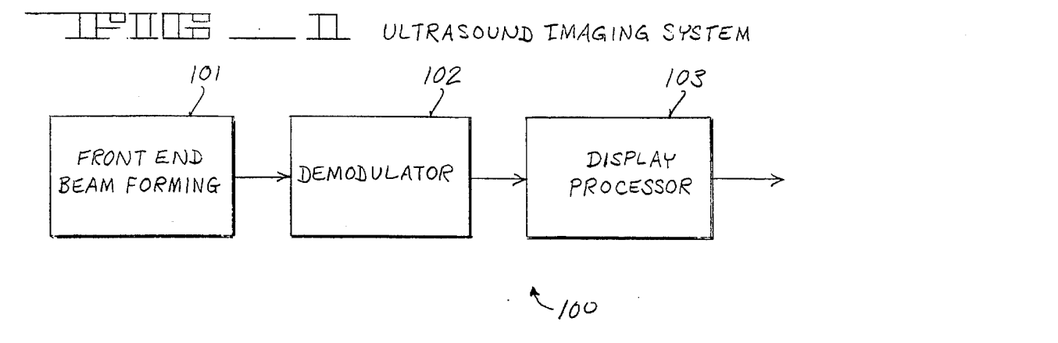
FIG. 1 is a block diagram of the prior art ultrasound imaging system.

The conventional ultrasonic imaging apparatus is shown in block diagram format as ultrasound imager 100 in FIG. 1. Referring to FIG. 1, front end processor 101 is coupled to demodulator 102. The output of demodulator 102 is coupled to display processor 103. Front end processor 101 typically includes a linear array, an annular array, and a single crystal probe with an analog or digital beam former. Front end processor 101 recurrently sends and receives ultrasonic waves into a body. Front end processor 101 produces modulated signals representing the data obtained from receiving the echoes that occurred within the body. Demodulator 102 receives the signal from front end processor 101 and produces the phase and amplitude information, having the characteristic of tissue and Doppler echo. In the prior art, the phase information is not utilized for any specific purpose for the B-scan images. Thus, in the prior art, the signals are only subjected to magnitude detection for displaying ultrasound B-scan images. The amplitude information generated from the magnitude detection would be output to display processor 103. Processor 103 would display images consisting of magnitude cluster from the signal. Phase information is used in ultrasound Doppler images. These Doppler images consist of overlapping multiple signals and determining the phase differences between the multiple signals. Phase information is not generated and displayed which depicts the phase difference between different parts of the same signal.

In the prior art, the baseband signal from front end processor 101 is demodulated using analog techniques. For instance, a full-wave or half-wave rectifier followed by a low pass filter would remove the carrier frequency utilized to modulate the signal. This technique, though good for amplitude modulation (A.M.) radio receivers, is not generally acceptable for ultrasound machines. Another analog technique uses the quadrature demodulator. In a quadrature demodulation system, a mixer is used to shift the RF frequency down to the baseband in order to extract the Doppler phase shift. In reality, the harmonic distortion, channel mismatching, component variation, etc., limit the performance and make it difficult to manufacture the system. Other analog techniques include squaring and peak detection. Even though these are viable techniques today, higher resolution B-scan image and sensitive Doppler information are becoming requirements for the next generation ultrasound machines. To achieve these results, a wide bandwidth and wide dynamic range signals must be processed because the echo from the body is considered as a wide band amplitude and phase modulated signal.

The prior art analog techniques do not adequately accommodate the wide band amplitude and phase modulated signals. Furthermore, the analog approaches have difficulty maintaining consistency from machine to machine and lack flexibility to accommodate requirements changes, as illustrated above.

The present invention allows for demodulation in ultrasound instruments. By providing a digital approach, reliability and consistency are improved. The present invention accommodates wide bandwidth and wide dynamic range signals. Furthermore, the present invention utilizes display and detection of phase information in ultrasound B-scan image.

SUMMARY OF THE INVENTION

A real-time ultrasonic imaging system is described. The imaging apparatus comprises a transmitter for producing the ultrasound and generating a signal in response to the ultrasound. The system also includes a demodulator which detects phase information. Finally, a display in the ultrasound imaging system displays the phase information. The imaging system includes an analog-to-digital interface where the signal reflected from the body is in analog.

The demodulator of the present invention includes a Hilbert transform which converts the real signal into an analytic signal. The demodulator also includes a complex mixer which minimizes distortion of the analytic signal by frequency and phase equalization. The complex mixer initially shifts the analytic signal to the baseband and then rotates the signal to center the frequency at the peak energy of the signal at zero. This shifting allows for easier processing of the signal. Furthermore, the rotation (i.e., shifting) of the signal can be done manually. Moreover, the rotation is performed using a rotator and a local oscillator.

The demodulator also includes a magnitude and differential phase generator which receives the shifted analytic baseband signal and generates the magnitude and phase information for the signal. The magnitude and phase information are then plotted on a B-scan image. The demodulator also includes a Doppler preprocessor which receives the shifted analytic baseband signal and extracts the Doppler data for displaying a Doppler image.

The differential phase generator of the present invention receives consecutive samples of the same signal and determines the difference in phase between the samples. This information is then used in a B-scan image. The differential phase generator also includes a phase compressor which eliminates the phase information when the magnitude of the signal is below a predetermined level.

BRIEF DESCRIPTION OF THE DRAWINGS

The present invention will be understood more fully from the detailed description given below and from the accompanying drawings of the preferred embodiments of the invention which, however, should not be taken to limit the invention to a specific embodiment but are for explanation and understanding only.

DETAILED DESCRIPTION OF THE INVENTION

A direct digital demodulator for use in ultrasound instruments is described. In the following description, numerous specific details are set forth such as specific processing steps, bit lines, etc., in order to provide a thorough understanding of the present invention. It will be obvious, however, to one skilled in the art that the present invention may be practiced without these specific details. In other instances, well-known signal processing steps have not been described in detail to avoid unnecessarily obscuring the present invention.

Figure 2:
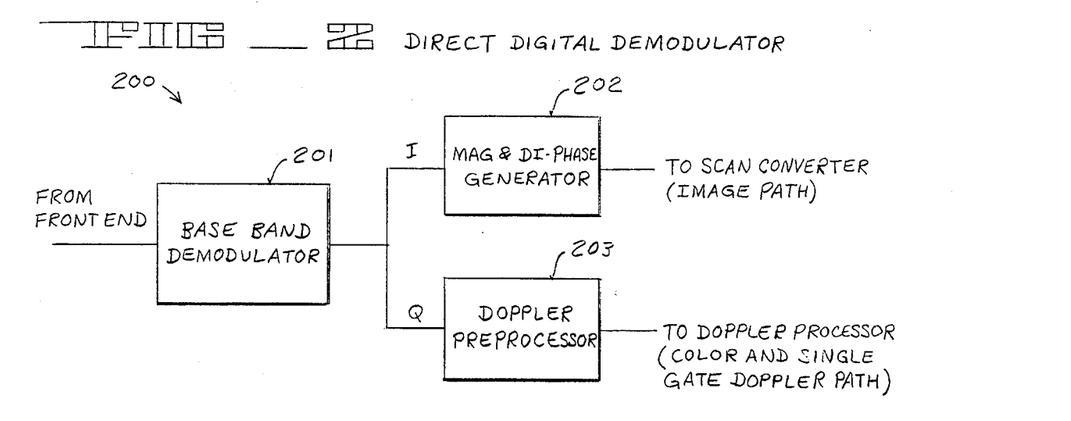
FIG. 2 is a block diagram of the direct digital demodulator of the present invention.

The direct digital demodulator of the present invention is shown as a block diagram in FIG. 2. Demodulator 200 consists of baseband demodulator 201, magnitude and differential (Di)-phase generator 202, and Doppler preprocessor 203. Baseband demodulator 201 is coupled to the front end of the ultrasonic imaging system (FIG. 1). The output of baseband demodulator 201 is coupled to both generator 202 and Doppler preprocessor 203. The output of generator 202 is coupled to the scan convertor (not shown). The output of Doppler preprocessor 203 is coupled to the Doppler processor (not shown). Both the scan convertor and the Doppler processor are parts of display processor 103 (FIG. 1).

Direct demodulation 200 is an analytic signal demodulator for wideband ultrasonic images. Direct demodulator 200 performs amplitude and phase demodulation on baseband signals to produce the imaging and Doppler signals at the radio frequency (RF) passband. In the currently preferred embodiment, demodulator 200 performs the demodulation digitally. Baseband demodulator 200 receives the signal from the summing point of front end 101 (FIG. 1) and transforms the signal into a analytic baseband signal. In the currently preferred embodiment, the transform is a Hilbert Transform. The Hilbert Transform is implemented using a finite impulse response filter (FIR) or an infinite impulse response (IIR) filter. In the currently preferred embodiment, the Hilbert Transform is implemented using a finite impulse response filter (FIR). Magnitude and Di-phase generator 202 receives the signal in complex form and derives the amplitude and phase information from the baseband signal. Generator 202 extracts the phase and amplitude information using a digital coordinate transform algorithm, which transforms the signal from rectangular to polar coordinates. In the currently preferred embodiment, the magnitude is extracted for the B-scan image using a true magnitude detector, instead of the envelope detector used in full wave rectifiers. Generator 202 extracts the phase information by generating the phase difference between successive samples of one ultrasound signal (i.e., vector). The phase and amplitude information is utilized to produce the B-scan image, including a phase and Di-phase image map. Doppler preprocessor 203 also receives the analytic baseband signal from demodulator 201. Preprocessor 203 performs a range gating function for acquiring the flow information on a specific portion of the ultrasound image. In the currently preferred embodiment, the range gating function performed by preprocessor 203 is accomplished using a digital matched filter (e.g., digital integrator or FIR filter). The range gated output information depicting the stenosis of the specific portion (i.e., the peak velocity, average velocity, etc.) is sent to the Doppler processor (not shown). The Doppler processor comprises a color flow mapping (CFM) or single-gate Doppler module for mean/variance estimation and power spectrum density calculation.

The currently preferred embodiment of direct demodulator 201 performs three main functions. First, demodulator 201 performs analog-to-digital (A/D) conversion in the RF band. This function, however, is not required when the ultrasonic imaging system employs a digital front end. Secondly, demodulator 201 produces the analytic signal using a Hilbert transform. Lastly, demodulator 201 shifts the signal to the baseband using a complex mixer. By performing the second and third functions, the signal from front end 101 is phase and frequency compensated.

DIRECT DEMODULATOR

Figure 3:
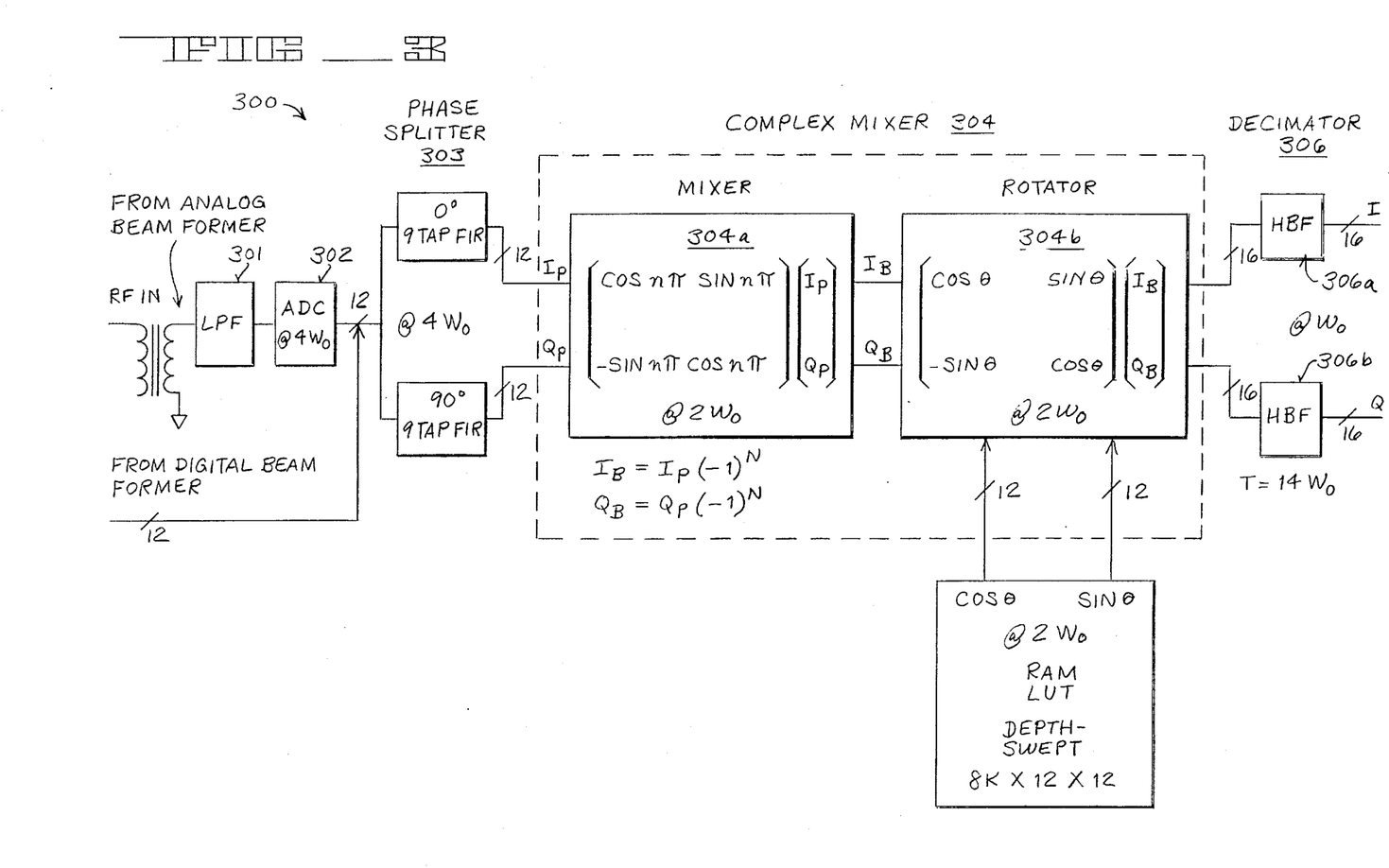
FIG. 3 is the currently preferred embodiment of the direct digital demodulator of the present invention.

A more detailed block diagram of baseband demodulator 201 is shown in FIG. 3, as demodulator 300. Referring to FIG. 3, a low pass filter (LPF), LPF 301, receives a signal from the analog beam former (not shown). LPF 301 is feed the signal from microtransformer 310, which effectively blocks the DC component. Transformer 310 and LPF 301 combine to produce a bandpass filter (BPF). LPF 301 is coupled to analog-to-digital convertor (ADC) 302. ADC 302 is coupled to phase shifter 303. It should be noted that if a digital beam former is attached to direct digital demodulator 201 (FIG. 2), then both LPF 301 and ADC 302 are not required. In this case, the output from the digital beam former would be coupled to phase shifter 303. Phase shifter 303 is coupled to complex mixer 304. Also coupled to complex mixer 304 is look-up table (LUT) 305. The output of complex mixer 304 is coupled to decimator 306. The output of decimator 306 is coupled to both magnitude and Di-phase generator 202 and Doppler preprocessor 203 (FIG. 2).

LPF 301 prevents the aliasing of the signal in A/D conversion and is characterized by the particular transmit carrier frequency utilized by the particular transducer in the ultrasonic imaging system. Therefore, when a high frequency carrier signal is used, the bandwidth of LPF 301 is higher in order to allow passage of a wideband image signal. On the other hand, for a low carrier frequency where there is good penetration and less resolution, the bandwidth of LPF 301 is lower in order to pass the signal with the best signal-to-noise (S/N) ratio. Furthermore, LPF 301 can be chosen to provide shaping of the signal as well. In the currently preferred embodiment, it is assumed that the maximum signal bandwidth is equal to the transmit carrier. Therefore, the corner or "cutoff" frequency of LPF 301 is at 1.5 times the carrier frequency or 3 dB from the passband.

The output signal of LPF 301 is converted from analog to digital by ADC 302. In the currently preferred embodiment, ADC 302 is a floating point 12-bit ADC and maintains 1/4096 of the full scale resolution when the input signal is less than a quarter of the full scale level. Furthermore, ADC 302 performs data compression. This is required due to the fact that the instantaneous dynamic range of a signal in ultrasonic imaging is usually more than 72 dB and the image display can only accommodate approximately 25–30 dB. Furthermore, the compression is required to increase the differentiability of the low level tissue echo, while suppressing the high level echoes. The data compression characteristics of ADC 302 are well-known in the art.

Figures 4A, 4B:
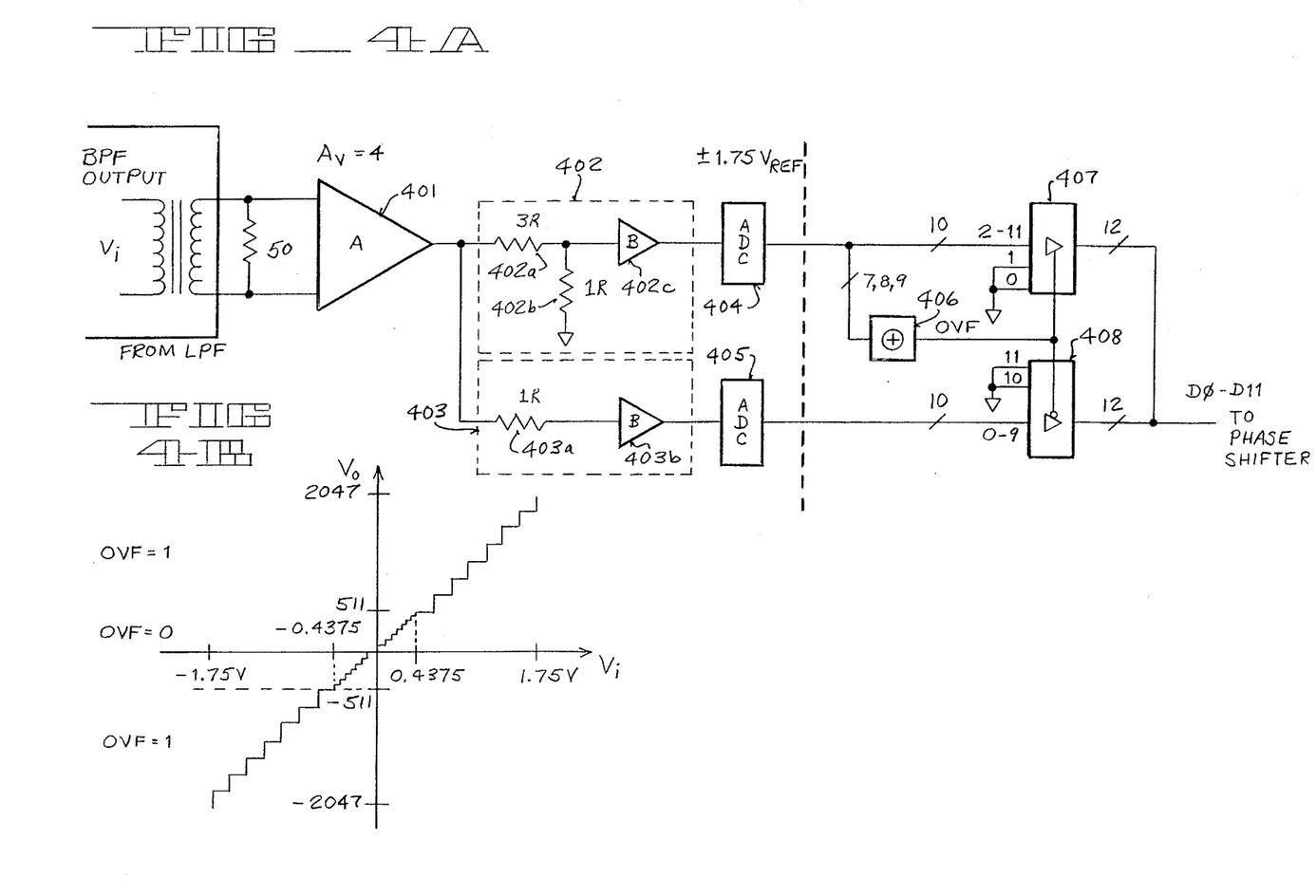
FIG. 4 is the currently preferred embodiment of the front end interface and data conversion unit of the present invention.

The currently preferred embodiment of ADC 301 is shown in FIG. 4A as ADC 400. Referring to FIG. 4, the signal is output from LPF 301 (FIG. 3) to resistor 410 which is parallel to amplifier 401. In the currently preferred embodiment, resistor 410 is a 50 ohm resistor. Resistor 410 is coupled in parallel to both of the inputs of amplifier 401. The output of amplifier 401 is coupled to attenuator 402. In the currently preferred embodiment, attenuator 402 comprises a 3 R resistor 402a, a 1 R resistor 402b, and a buffer 402c. Resistor 402a is 3 times as large as resistor 402b. Resistor 402a is coupled to the output of amplifier 401. The other end of resistor 402a is coupled to one end of resistor 402b and the input of buffer 402c. The other end of resistor 402b is coupled to ground. The output of buffer 402c is coupled to ADC 404. The output of amplifier 402 is also coupled to attenuator 403. In the currently preferred embodiment, attenuator 403 comprises a 1 R resistor 403a, and buffer 403b. The output of amplifier 402 is coupled to one end of resistor 403a. The other end of resistor 403a is coupled to the input of buffer 403b. The output of buffer 403b is coupled to the input of ADC 405.

The output of attenuator 402 is coupled to the input of ND converter (ADC) 404. The output of attenuator 403 is coupled to the input of ADC 405. The outputs of ADC 404 and 405 are coupled to the inputs of multiplexers 407 and 408 respectively. The 7th, 8th, and 9th bits of the output of ADC 404 are also coupled to the inputs of exclusive-OR gate 406. The output of exclusive-OR gate 406 is coupled to multiplexers 407 and 408 respectively. The output of multiplexers 407 and 408 is coupled to the input of phase shifter 303 (FIG. 3).

Upon receiving the signal from LPF 301 (FIG. 3), amplifier 401 amplifies the signal by a factor of four and then outputs the signal to both attenuator 402 and attenuator 403. Attenuator 402 is a 4:1 attenuation stage. Therefore, attenuator 402 decreases the magnitude of the signal by a factor of four. Thus, the output of attenuator 402 is the same as the signal from LPF 301. Attenuator 403 is a 1:1 attenuation stage. Therefore, attenuator 403 does not increase or decrease the magnitude of the signal on its input. The outputs of both attenuator 402 and attenuator 403 are input to ADC 404 and ADC 405 respectively, which are identical 10-bit ADCs. In the currently preferred embodiment, both ADCs 404 and 405 utilize a ±1.75 volt reference. Because the reference voltage is the same for both, ADC 400 has good tracking. ADC 404 converts the output signal from attenuator 402 from analog to digital. Similarly, ADC 405 converts the output signal of attenuator 403 from analog to digital. In the currently preferred embodiment, ADCs 404 and 405 are the ADC 9060 A/D converters from Analog Devices. The digital signals output from ADC 404 and 405 are then input to multiplexers 407 and 408 respectively.

Multiplexor (MUX) 407 receives the 10-bit output signal from ADC 404 on bit lines 2–11. The 0 and 1 bit lines of MUX 407 are grounded. Multiplexor (MUX) 408 receives the 10-bit output from ADC 405 on bit lines 0–9. The 10–11 bit lines of MUX 408 are grounded. Exclusive-OR gate 406 controls MUXs 407 and 408. Exclusive-OR gate 406 utilizes the 7th, 8th, and 9th bits from the output of ADC 404 to select which digitized signal is output from ADC 400 to phase shifter 303 (FIG. 3). Thus, exclusive-OR gate 406 controls the selection of the desired ADC channel.

The full scale range of the signal from the front end is shown in FIG. 4B. Referring to FIG. 4B, the input voltage, $V_i$, ranges from 0 to ±1.75 volts. In response to the input voltage, $V_i$, the output voltage, $V_o$, ranges from 0 to ±2047. When $V_i$ is between ±0.4375 volts, the output is from 0 to ±511. This is the first quarter of the full scale of input/output characteristics of ADC 400. Using ADC 400, when the signal is small, it is quantized (i.e., a small step is added). A larger step is added for a bigger signal. In the currently preferred embodiment, where signals are smaller than ±0.4375 volts, the ADC step is 0.856 mV (0.877 volts/1024). Otherwise, the step is 3.42 mV. When the incoming signal is in the first quarter of the full scale range (i.e., ±0.4375 volts), the 7th, 8th, and 9th bits are the same. In this situation, the output of exclusive-OR gate 406 is a logical 0 and the signal multiplexed by ADC 405 is output to phase splitter 303 (FIG. 3). Thus, the digitized output signal from ADC 400 is in a 1:4 ratio with its input signal. In all other situations, the output of exclusive-OR 406 is a logical 1 and the digitized signal from ADC 404 is selected as the output of ADC 400 in which the digitized signal output is in a 1:1 ratio with the input signal. In either case, the output signal of ADC 400 is a 12-bit integer value.

Moreover, by using two A/D converters with low resolution, a wider dynamic range is created. When using only one A/D converter, a 10-bit resolution (1/1024) is produced. The two A/D converter implementation still produces a 1/1024 resolution; however, two bits are added to increase the dynamic range. The extra two bits create a 12-bit dynamic range (i.e. 72 dB). In this manner a finer resolution is created for the low level signal.

Referring back to FIG. 3, the output of ADC 302 is coupled to phase splitter 303. Phase splitter 303 transforms the passband signal from ADC 302 to an analytic signal. The purpose behind the transformation is derived from the operation of demodulator 300. Demodulator 300 operates by shifting the passband signal to the baseband signal. The image information is shifted to the baseband to make processing easier. The received passband signal consists of a signal having both positive and negative frequencies. Directly shifting the signal to the baseband causes these signals to overlap. The overlapping of the positive and negative portions of the passband signal eliminates the phase and Doppler information as well as influences (i.e. decreases) the magnitude of the passband signal. To avoid these problems, phase splitter 303 converts the signal to a complex signal, thereby eliminating the negative frequencies. Thus, when demodulator 300 shifts the passband signal to the baseband for processing, the phase and doppler information and the magnitude remain unaffected.

In the currently preferred embodiment, phase shifter 303 is a Hilbert transform that transforms the passband signal to a complex signal. Mathematically, the signal is in the form:

$$H = Ip + jQp$$

where H represents the signal having real component Ip and imaginary component $Q_p$. To implement the digital Hilbert transform of phase shifter 303 in real time, the currently preferred embodiment a Finite Impulse Response (FIR) digital filter is utilized, with the length of eighteen taps (delay). In the present invention, the Hilbert transform is a complex bandpass filter. In this manner, the Hilbert transform of the currently preferred embodiment sets the signal bandwidth. The sampling rate is fixed at four times the transmit center frequency. This allows one FIR filter to accommodate all possible transducers. In the currently preferred embodiment, the filter has notches at both the DC value of and two times the value of the center frequency. In the currently preferred embodiment, the FIR digital filter is a TRW TMC2250.

Once the signal has been converted to complex (analytic) format, the signal is shifted to the baseband by complex mixer 304. Complex mixer 304 performs phase and frequency equalization to minimize the distortion on the received echo present in the analytic signal. Mathematically, complex mixer 304 rotates the complex signal output from phase splitter 303 to the baseband. Complex mixer 304 comprises mixer 304a and rotator 304b. Mixer 304a allows the signal to be centered on zero frequency (i.e., move to DC). Functionally, mixer 304a receives the $I_p$ and $Q_p$ outputs from phase splitter 303 and generates two outputs $I_B$ and $Q_B$. The outputs of mixer 304a correspond to the equations:

$$I_B = I_p(-1)^N$$

$$Q_B = Q_p(-1)^N$$

where N is the sample index corresponding to the sample as a function of time. Mathematically, mixer 304a generating the outputs using matrix multiplication, as depicted by FIG. 3. The values in the 2×2 matrix are normally alternative patterns of 1 and −1. This is due to the sampling frequency being four times that of the center frequency. In this situation, each move occurs at 90° intervals. Therefore, the respective sine and cosine values are 0, 1 or −1. For further decimation by two, the outputs, as determined according to the above equations, are inputs to rotator 304b.

Rotator 304b receives the outputs of mixer 304b and compensates for attenuation of high frequency signals. In ultrasound, when echo signals come back, the high frequency signals are more attenuated due to the depth and tissue characteristics of the living organism. Thus, after the passband signal has been shifted to the baseband, the center frequency is not at zero; the peak energy of the signal is often shifted down. To compensate for the "off-peak," the signal must be "rotated" or shifted slightly to obtain the best signal-to-noise ratio. In this manner, the peak of the signal can be moved to the center frequency. The shifting is arbitrary, such that any shift could be obtained.

To implement the shift, rotator 304b performs matrix multiplication, wherein a 2×2 matrix is multiplied by the input values $I_B$ and $Q_B$. The values in the matrix are the cosine φ, sine φ, -sine φ and the cosine φ corresponding to the four matrix locations (i.e. locations 1,1; 1,2; 2,1; and 2,2 in the 2×2 matrix respectively). Because the body has varying amounts of frequency dependent attenuation with respect to the depth and tissue characteristics and because this attenuation changes from patient to patient, rotator 304b shifts the baseband signal arbitrarily. The arbitrary shifting equalizes the attenuation to optimize the best image quality. To obtain the ability to shift the shifted baseband signal arbitrarily, look-up table (LUT) 307 is coupled to rotator 304b. LUT 307 is a depth controlled 8K×12×12 static random access memory (SRAM) that supplies the 2×2 matrix of rotator 304b with sine and cosine values to change the frequency and phase at the local oscillator level. In this manner, LUT 307 acts as a local oscillator supplying a reference vector from which the phase information is compared later. In the currently preferred embodiment, the frequency attenuation compensation curve can be set up by the operator through the use of paddles on the machine. This compensation is translated into coefficients that represent a tuning local oscillator. This compensates the amplitude and phase distortion and improves the image quality. Thus, LUT 307 serves three functions. First, LUT 307 acts as a local oscillator. Second, LUT 307 provides phase compensation, and thirdly, LUT 307 provides frequency compensation.

Mixer 304a and rotator 304b each utilize the multiplication of a 2×2 matrix. Since the 2×2 matrix of mixer 304a only includes alternating 1 and −1 values, the two matrices can be combined. The 1 and −1 values are integrated into LUT 307. In this manner, complex mixer 304 can be implemented as one unit. In the currently preferred embodiment, complex mixer 304 is a TRW TMC2249 or Plessy PDSP16112.

Moreover, complex mixer 304 operates at twice the center frequency, but at one half the frequency at which phase splitter 303 operates. This is due to the fact that complex mixer 304 receives two inputs. Therefore, the sampling rate need not be as high and results in a lower cost part. Slowing the frequency allows the word length to be increased. In doing so, the output of complex mixer 304 is 16 bits wide as opposed to two inputs of 12 bits each.

The output of complex mixer 304 is input to decimator 306. Decimator 306 comprises a low pass filter for reducing the noise bandwidth and further decimating the data rate to the transmit carrier. The output of the decimation occurs at the carrier frequency, as opposed to twice the frequency of the carrier at which complex mixer 304 operates. In the currently preferred embodiment, decimator 306 comprises two half band filters 306a and 306b. This improves the signal to noise (S/N) ratio. In the currently preferred embodiment, the half band filter is TRW TMC2242. The output of decimator 306 is input to both magnitude and Di-phase generator 202 and Doppler preprocessor 203 (FIG. 2).

Detailed Theory Of Operation

Assuming the body is a complex impulse response model, $$h(t) = hp(t) + j\, hq(t)$$

or in the polar form $$A(t)\exp[-j\theta(t)]$$

where A(t) is the amplitude response, θ(t) is the phase response.

The transmit burst is $$xt(t) = \cos(wct)g(t) \quad \text{where } g(t) = 1 \text{ for } CW$$
$$g(t) = \sqcap \text{ for pulse.}$$

The received signal appearing at the input of phase splitter 303 will be $$\begin{aligned} xr(t) &= A(t)\cos[wct - \theta(t)] \\ &= Re\{A(t)\exp(-j\theta(t))\exp(jwct)\} \\ &= hp(t)\cos(wct) + hq(t)\sin(wct) \end{aligned}$$

The body can be fully characterized by the impulse response xr(t). The output of phase splitter 303 (i.e., the Hilbert transform output) is $$xr(t) = hp(t)\sin(wct) - hq(t)\cos(wct)$$

Function xr(t) is the real part of the complex signal, jxi(t) is the imaginary part. The function x(t) represents the complex signal.

$$\begin{aligned} x(t) &= xr(t) + jxi(t) \\ &= A(t)\exp\{j[wct - \theta(t)]\} \end{aligned}$$

At the input of complex mixer 304

$$\begin{aligned} x(t)\exp(-jwct) &= A(t)\exp[jwct - \theta(t)]\exp[-jwct] \\ &= A(t)\exp[-j\theta(t)] \quad [1] \\ &= hp(t) + jhq(t) \quad [2] \end{aligned}$$

The body characteristics get recovered in the polar form [1] and rectangular form [2]. A(t) is the amplitude response, $\theta(t)$ is the phase response.

The Digital Implementation

Assuming the transmit trigger is at phase zero, the local oscillator will be cos (wct), and the transmit burst from the transducer in front end 101 (FIG. 1) is $$\cos(wct - wct') \text{ or } \cos(wct - \phi)$$

where t' is the time delay from trigger to the transducer burst, $\phi$ is the fixed phase delay. The received signal should be modified to $$\begin{aligned} xr(t) &= hp(t)\cos(wct - \phi) + hp(t)\sin(wct - \phi) \\ &= Re\{A(t)\exp[j(wct - \phi)]\exp[-j\theta(t)]\} \\ &= A(t)\cos[wct - \phi - \theta(t)] \end{aligned}$$

The output of ADC 302 is:

$$xr(kT) = hp(kT)\cos(wckT - \phi) + hq(kT)\sin(wckT - \phi)$$

where k is non-negative integer

The output of phase splitter 303 (i.e. the outputs of the Hilbert transform) is:

$$\begin{aligned} xr(kT) &= hp(kT)\sin(wckT - \phi) - hp(kT)\cos(wckt - \phi) \\ x(kT) &= xr(kT) + jxi(kT) \\ &= A(kT)\exp\{j[wckT - \phi - \theta(kT)]\} \end{aligned}$$

The output of complex mixer 304 is:

$$x(kT)\exp[-jwckT] = A(kT)\exp\{j[wckT - \phi - \theta(kT)]\}\exp[-jwckT]$$

Depending of the sampling rate

Case one: sampling at wc, $T = 2\pi/wc$
$$\begin{aligned} x(kT)\exp[-jwckT] &= \\ A(kT)\exp[j2\pi k]\exp(-j\phi)\exp[-j\theta(kT)]&\exp[-j2\pi k] = \\ &A(kT)\exp\{-j[\theta(kT) + \phi]\} \end{aligned}$$

Case two: sampling at 4wc, $T = 2\pi/4wc$
$$x(kT)\exp[-jwckT] =$$
$$A(kT)\exp\{j[(2\pi k/4) - \phi - \theta(kT)]\}\exp\{-j[2\pi k/4]\}$$

the implementation is
$$x(kT)\exp[-jwckT] =$$
$$[xr(kT) + jxi(kT)][\cos(-\pi k/2) + j\sin(-\pi k/2)]$$
$$A(kT)\exp\{-j[\theta(kT) + \phi]\} =$$

$$\begin{bmatrix} hp'(kT) \\ hq'(kT) \end{bmatrix} = \begin{bmatrix} \cos(-\phi) & -\sin(-\phi) \\ \sin(-\phi) & \cos(-\phi) \end{bmatrix} \begin{bmatrix} hp(kT) \\ hq(kT) \end{bmatrix} =$$

$$\begin{bmatrix} \cos(\pi k/2) & \sin(\pi k/2) \\ -\sin(\pi k/2) & \cos(\pi k/2) \end{bmatrix} \begin{bmatrix} xr(kT) \\ xi(kT) \end{bmatrix}$$

The hp' (kT), hq' (kT) are output to a FIR match filter which can be a simple integrator, over the sample volume and sent to the Doppler processor and color flow mapping processor of display processor 103 (FIG. 1).

Magnitude and Di-phase Generator

Figure 5:
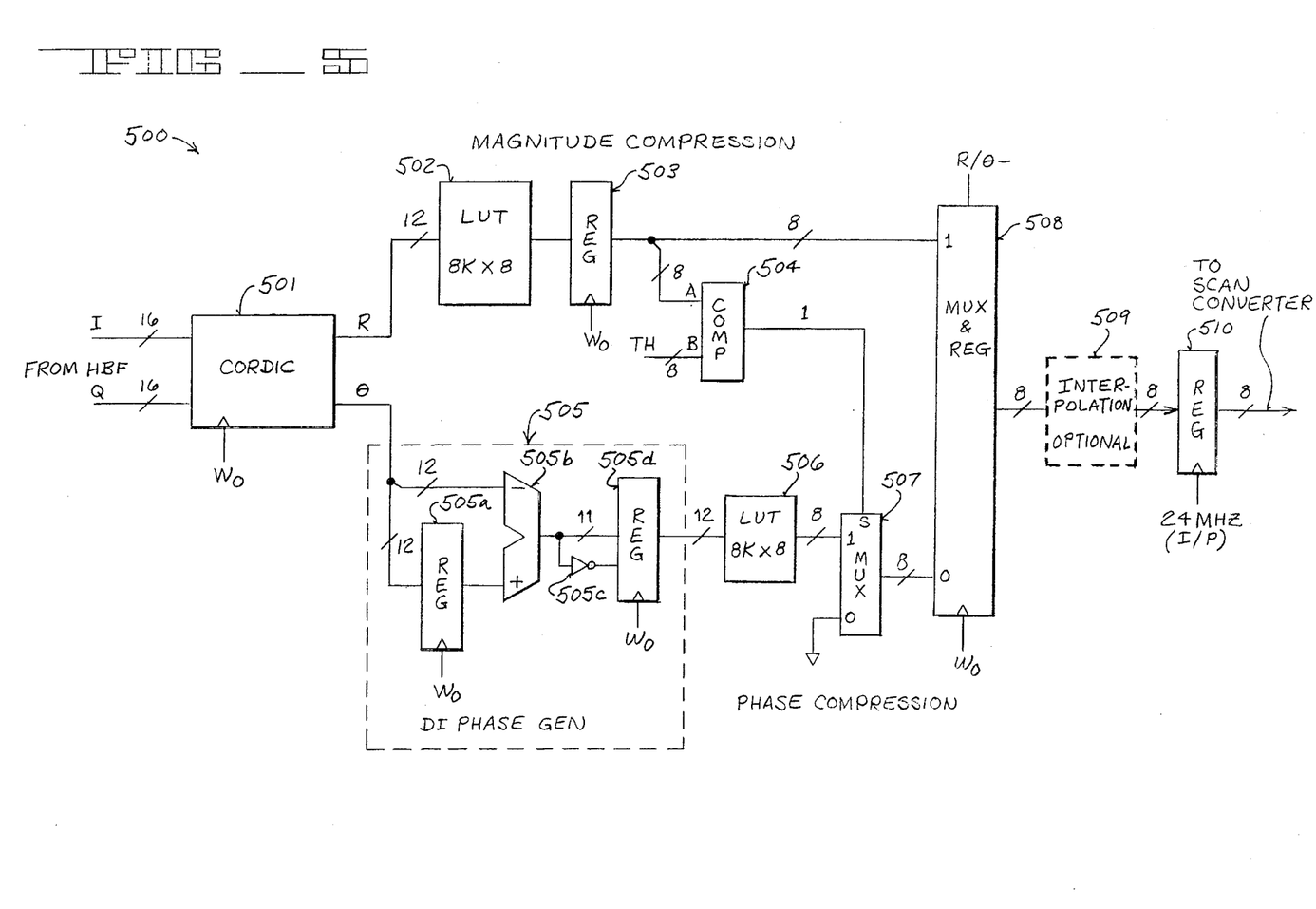
FIG. 5 illustrates the magnitude and differential phase generator schematic for the currently preferred embodiment of the present invention.

In the currently preferred embodiment, the magnitude and Di-phase is shown in FIG. 5. Generator 500 consists of cordic 501 receiving the I and Q output signals from demodulator 300 (FIG. 3). Referring to FIG. 5, one of outputs of cordic 501 is coupled to look-up table (LUT) 502. The output of LUT 502 is coupled to register 503. The output of register 503 is coupled to both input A of comparator 504 and the "1" input of multiplexor (MUX) 508. The output of MUX 508 is coupled to interpolator 509. The output of interpolator 509 is coupled to register 510. The output of register 510 is coupled to the scan converter (not shown).

The other output of cordic 501 is coupled to Di-phase generator 505. Generator 505 comprises register 505a, multiplexer 505b, inverter 505c, and register 505d. The output of cordic 501 is coupled to both register 505a and multiplexer 505b. The output of register 505a is also coupled to multiplexer 505b. The output of multiplexer 505b is coupled to the inverter 505c and one of the inputs to 505d. The other input to register 505d is coupled to the output of inverter 505c and the carrier frequency. Register 505d also receives the carrier frequency, $w_o$, as a clock. The output of register 505d, which is the output of Di-phase generator 505, is coupled to look-up table 506. The output of LUT 506 is coupled to multiplexor (MUX) 507. The other inputs to MUX 507 are the output of comparator 504 and ground at the "1" inputs and "0" inputs respectively. The output of MUX 507 is coupled to the "0" input of MUX 508. MUX 508 also receives the carrier frequency, $w_o$, as a clock.

Magnitude and Di-phase generator 500 processes the baseband signal output of demodulator 200 (FIG. 2) for image generator by the scan converter (not shown). Referring to FIG. 5, cordic 501 receives the amplitude and phase information in rectangular form and transforms it into polar coordinates. For instance, cordic 501 determines the magnitude R of the baseband signal according to the equation:

$$R = \sqrt{I^2 + Q^2}$$

Both the magnitude R and phase θ are 12-bit signals. Thus, cordic 501 reduces the output of demodulator 200 from a 16-bit signal to a 12-bit signal. In the currently preferred embodiment, cordic 501 is a TRW TMC2230.

The magnitude signal R is input to look-up table (LUT) 502. LUT 502 is a 8K×8 compression table which compresses the data from 72 dB to 25–30 dB (i.e., from 12 bits to 8 bits). Since the magnitude information is directly related to the echo strength from the body, LUT 503 is utilized to increase the tissue differentiability for low level signals before the signals are sent to the image processing module (i.e. the scan converter)in display processor 101 (FIG. 1 ).

The compressed signal from LUT 502 is input to register 503. Register 503 is an 8-bit register which receives the data at the carder frequency $w_o$. Register 503 receives the compressed baseband signal and resamples it. The output of register 503 is input to comparator 504 and MUX 508. When the input of MUX 508, corresponding to the compressed magnitude signal from register 503, is chosen, MUX 508 outputs the signal to interpolator 509. MUX 508 outputs either the magnitude or phase information according to the user selection at the R/θ input. Interpolator 509 is optional and is required where the user has a zoom feature for focusing in and enlarging a portion of the display. In this situation, interpolator 509 provides interpolation for the vector data to the nearest rectangular vector scan coordinate used by the scan converter (not shown). The output of interpolator 509, or the output of MUX 508 when an interpolation device is not required, is input to register 510. Register 510 receives the input frequency of the image processing module. In the currently preferred embodiment, register 510 receives a 24 MHz signal and outputs the image information to a scan converter (not shown) at that frequency.

Cordic 501 also generates phase information θ in the form of a 12-bit signal from the 16-bit I and Q inputs. The phase signal θ is input to the Di-phase generator 505. In Di-phase generator 505, the phase input, signal θ, is input to register 505a. Register 505a resamples the phase signal at the carrier frequency $w_o$ and outputs the signal during the next sample. Therefore, when the next sampling occurs, the output of register 505a represents the previous sample of phase input signal θ. The current sampling of the phase input signal θ is also input to one of the inputs to differential generator 505. The other input receives the phase signal from the previous sampling. Differential generator 505b receives the new phase information and also the previous phase information from register 505a and determines the phase difference between the two samples. Thus, Di-phase generator 505 determines the phase difference between consecutive samples of a single signal (i.e., one vector). The phase difference is output from differential generator 505b to the input of inverter 505c and the input of register 505d.

Differential generator 505b produces a 2's complement output in the currently preferred embodiment. However, the image processing module (i.e. scan converter) cannot display 2's compliment data because it does not recognize negative phases on the screen. To fully recognize the signal spectrum, it must be made non-negative. Therefore, instead of ranging from π to −π, the spectrum ranges from 0 to 2π in order to display the data. Inverter 505c and register 505d act to convert the 2's compliment output of differential generator 505b, which is 12 bits, to offset binary. This ensures that the phase output signal θ from Di-phase generator 505 is always positive.

Inverter 505c adds the extra bit into register 505d which receives the output of differential generator 505d. Register 505d resamples the phase signal θ at the carrier frequency $w_o$ and outputs a 12-bit phase signal θ.

The phase signal θ is then input to LUT 506 which compresses the signal from 12 to 8 bits, in the same manner as the magnitude was compressed by LUT 502. The compressed output signal LUT 506 is input to one of the inputs of MUX 507. In the currently preferred embodiment, it is input to the 1 input of MUX 507. The other input of MUX 507 is coupled to ground.

The output of MUX 507 is dependent on the output of comparator 504. Comparator 504 receives the magnitude of the current signal at its A input from the output of register 503. The other input of comparator 504 is coupled to a predetermined threshold value. The predetermined threshold value is the magnitude value below which the phase information does not have any meaning. This is because it is too heavily corrupted by noise. In the currently preferred embodiment, the threshold value can be set by the operator. When the magnitude value is greater than or equal to the threshold value, the output of comparator 504 is a logical 1. The logical 1 is input to MUX 507 and causes MUX 507 to allow the phase signal θ to be input to MUX 508 at its zero inputs. When the magnitude value is less than the threshold value, the output of comparator 504 is a logical 0. The logical 0 is input to MUX 507 and prevents MUX 507 from passing the phase signal θ to MUX 508. In this situation, a 0 is input the zero input of MUX 508. Thus, comparator 504 acts as a magnitude threshold detector which rejects the phase information when the magnitude is too small.

Depending on the user's desire, MUX 508 allows passage of either the magnitude or phase information signals. In the currently preferred embodiment, an input of a logical 1 to the selection port of MUX 508 causes MUX 508 to output the magnitude information, and an input of a logical 0 to the selection port of MUX 508 causes MUX 508 to output the phase information to the image processing module (i.e. the scan converter).

When the output of MUX 508 is the phase information, the signal is input to interpolator 509, if present, and then to register 510. Register 510 receives the clock from the image processing module (not shown) and then outputs the phase information as an 8-bit signal. The image processing module then displays the phase information.

Phase information is related to the acoustic impedance in the body. For the phase information, the absolute phase information is not easy to maintain consistently from system to system. The relative phase information is more important for tissue characterization.

Doppler Preprocessor

Figure 6:
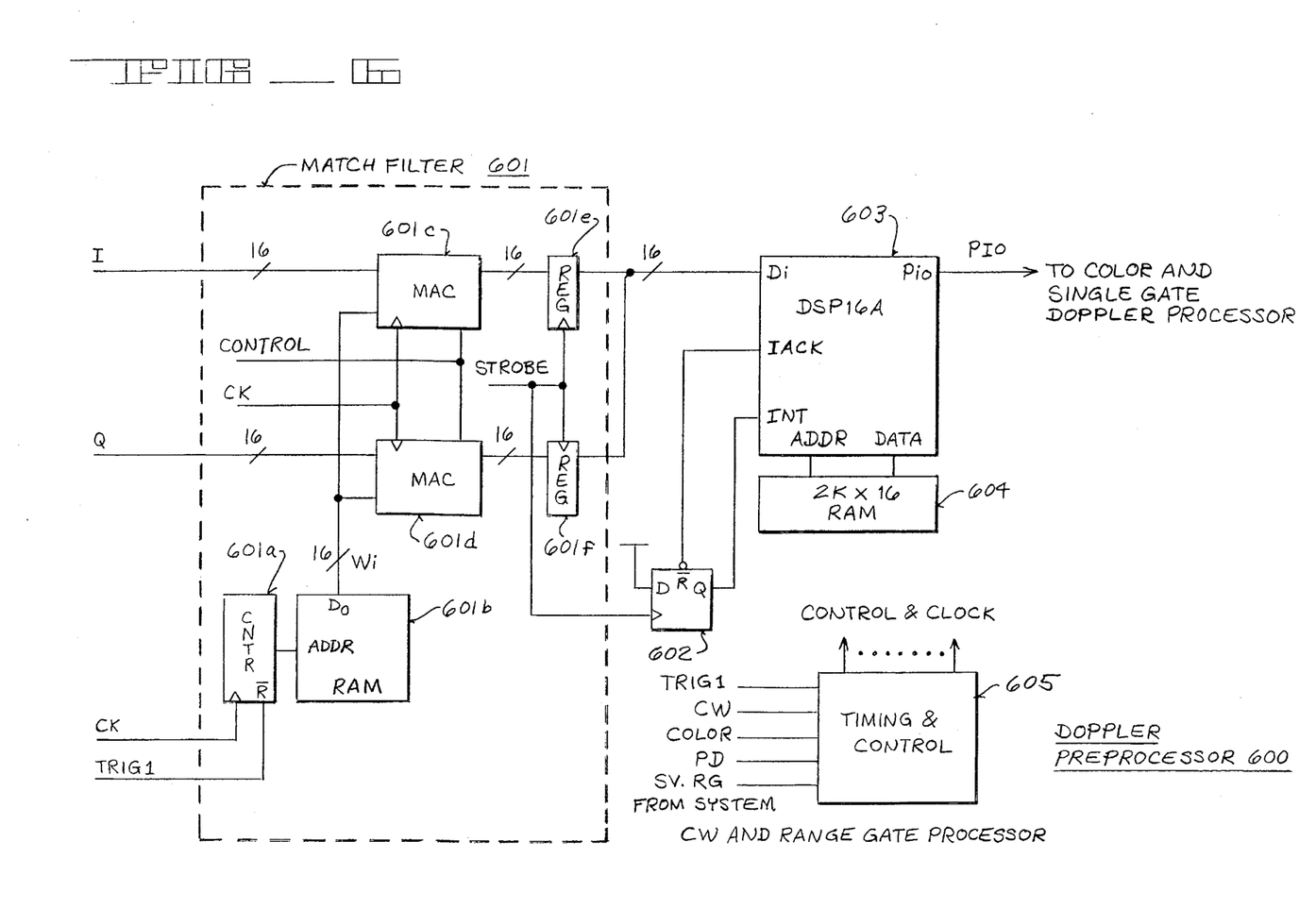
FIG. 6 illustrates the currently preferred embodiment of the Doppler preprocessor of the present invention.

FIG. 6 displays the currently preferred embodiment of the Doppler preprocessor of the present invention as preprocessor 600. Referring to FIG. 6, preprocessor 600 receives the 16-bit I and Q outputs signals from demodulator 300 (FIG. 3). The I and Q signals are input into match filter 601. The baseband I and Q signals contain all the magnitude and phase information along the vector. The flow can be obtained by evaluating the phase change for a specific sample volume from pulse to pulse. The FFT algorithm and the autocorrelation function are used in the single gate and color Doppler respectively.

The I and Q signals are each coupled to one input of the multiply accumulators (MACs) 601c and 601d respectively. The other inputs of MAC 601c and MAC 601d are coupled to the coefficient static RAM 601b. The input to SRAM 601b is coupled to the output of control block, CNTR 601 a. CNTR 601a receives the clock signal CK and the trigger signal TRIG 1 as inputs. MAC 601c and MAC 601d also receive the clock signal CK and a control signal from timing and control block 605. The outputs of MAC 601c and MAC 601d are coupled to registers 601e and 601f respectively. Registers 601e and 601f also receive the STROBE signal as an input. The output of registers 601e and 601f are coupled to digital signal processor 603 (DSP 16A). DSP 603 also receives an input from the Q output of D flip flop 602. DSP 603 also receives an input from the R output of D flip flop 602. D flip flop 602 receives the STROBE signal at its clock input. Its D input is held at a potential above ground. DSP 603 also receives address and data inputs from RAM 604. In the currently preferred embodiment, RAM 604 is 2K×16 RAM. The output of DSP 603 is coupled to the color and single gate Doppler processor (not shown).

In the ultrasound system, a range gate can be used to locate a point on the B-scan display to determine changes in velocity at that point. Doppler preprocessor 600 does not act upon the data on its I and Q inputs until a specific range gate has been set by the user. At that time, the only data preprocessor 600 acts upon is the data corresponding to the area within the chosen range gate.

The range gate data is input to match filter 601; more particularly, the data is input to MAC 601c and 601d respectively, as 16-bit signals I and Q. MACs 601c and 601d multiply the input signal I and Q by coefficients. In this manner, an FIR match filter is implemented. RAM 601d supplies the coefficients to MACs 601c and 601d as 16-bit signals $w_i$. RAM 601d supplies the coefficient in response to an address from CNTR 601a. The coefficients from RAM 601b match the transmit waveform. This allows for the S/N ratio to be optimized for the signal. Depending on the shape and depth of the transmit waveform, SRAM 601b is programmed with coefficients to optimize the S/N ratio for each sample volume.

After the I and Q input data signals from demodulator 300 (FIG. 3) have been multiplied in MACs 601c and 601d, the outputs are input to registers 601e and 601f respectively. Registers 601e and 601f receive a STROBE signal which, when asserted, allows the data to be output from match filter 601 to DSP 603. When DSP 603 asserts its output enable, the values in register 601e and 601f are input successively into DSP 603 by multiplexing the data.

Each time that data is ready, the STROBE signal is asserted and DSP 603 receives both the I and Q data from registers 601e and 601f. This is accomplished using D flip-flop 602. When the STROBE signal is asserted, the Q output of D flip-flop 602 goes high sending DSP 603 an interrupt on INT pin to indicate that new data is ready. DSP 603 acknowledges the interrupt on its interrupt acknowledge pin, IACK. D flip-flop 602 receives the interrupt acknowledge on its reset input and, in response, resets D flip-flop 602. Subsequently, the next STROBE signal produces another high output at the Q output of D flip-flop 603.

Upon receiving the output at match filter 601, DSP 603 further processes the data for the color and single gate Doppler processor (not shown) using the 2K×16 RAM. The process includes range gate overlapping for color. Thus, DSP 603 acts as an interface to the color and single gate Doppler processor. For the CW case, the new data should be the same because there is no range gate. In this situation, match filter 601b is utilized as a first stage decimation filter, and DSP 603 is used as a second stage decimator filter.

Timing and control for Doppler preprocessor 600 are generated by timing and control block 605. Timing and control block 605 generates the control and clock signals in response to the TRIG1, CW, color, PD and SV RG signals. The source of these input signals is the system control circuitry (not shown). The operator sets the mode (e.g. CW, color image, etc.) The TRIG1 signal indicates when the burst was fired. The CW signal from the control circuitry indicates that Doppler preprocessor 600 is to be in continuous wave mode. The color signal indicates to the Timing and Control Block (T & C) 605 that the system is in color image mode. The PD signal indicates to T & C block 605 that Doppler preprocessor is to be supplying pulsed Doppler information. The SV RG signal indicates where the range gate is to be placed. In response to these inputs, T & C block 605 generates the necessary timing and control signals.

An advantage of the present invention is that a phase map can be generated in ultrasound machine for real-time tissue characterization. The phase information could be used to differentiate between various types of organs and between organs and tissue types. It is believed that the phase information could be utilized to differentiate tissue structures within a tissue type. For instance, the phase information could be used to determine whether blood is free flowing or coagulated. Moreover, it is believed that the phase information generated by the present invention could find applications in assisting in the diagnosis of cancer and other tissue diseases and abnormalities.

Another advantage is that since the single gate Doppler and real time scan converter are already in digital or advanced DSP or ASICs already, the present invention is easily interfaced with commercially available systems. Only a minor modification on the I/O interface allows the direct digital demodulator of the present invention to meet the processor requirements. Thus, a complete digital system becomes attainable.

Using an analog demodulation scheme, the component variation over different temperatures and vendors, the mismatching between In-phase Quad-phase channels and the linearity of the amplifier will all limit the dynamic range, S/N ratio, manufacturing cost and reliability of the system. A digital demodulation scheme can avoid these limitations and make the system high performance and more reliable.

Whereas many alterations and modifications of the present invention will no doubt become apparent to a person of ordinary skill in the art after having read the foregoing description, it is to be understood that the particular embodiment shown and described by way of illustration are in no way intended to be considered limiting. Therefore, reference to the details of the preferred embodiments are not intended to limit the scope of the claims which themselves reside only those features regard as essential to the invention. Thus, a direct digital demodulator for an ultrasound imaging system has been described.

What is claimed is:

1. A real-time ultrasonic imaging apparatus comprising:

transmission means for transmitting and receiving ultrasonic sound, said transmission means generating a modulated signal in response to the received ultrasonic sound;

demodulation means for receiving said modulated signal and detecting phase information along the path of said modulated signal, said demodulation means generating a phase information signal representing phase change in the spatial domain of said modulated signal; and display means coupled to said demodulation means for displaying said phase information in response to said phase information signal to depict the phase information by a graphical representation on a display.

2. The ultrasonic imaging apparatus as defined in claim 1 wherein said demodulation means performs phase and frequency compensation.

3. The ultrasonic imaging apparatus as in claim 1, wherein said modulated signal comprises an analog signal, and wherein said imaging apparatus further includes interface means coupled to said transmission means comprising:

filter means for receiving said modulated signal and eliminating the DC component of said modulated signal; and an analog-to-digital conversion means for receiving said modulated signal from said filter means and digitizing said modulated signal, such that said demodulation means receives said digitized modulated signal.

4. The ultrasonic imaging apparatus as in claim 1, wherein said demodulation means includes a coordinate transform means for extracting said phase information from said phase information signal.

5. The apparatus defined in claim 1 wherein the demodulation means comprises processing logic to process the phase information into phase data suitable for display on a display.

6. The imaging apparatus defined in claim 1 wherein the demodulation means generates the phase information signal by generating a phase difference between successive samples of said modulated signal.

7. A real-time ultrasonic imaging apparatus comprising:

transmission means for transmitting and receiving ultrasonic sound, said transmission means generating a modulated signal in response to the received ultrasonic sound;

digital demodulation means for receiving said modulated signal and detecting phase information along the path of said modulated signal that represents a phase difference between successive samples of said modulated signal, said transmission means generating a phase information signal representing said phase information in said modulated signal, wherein said demodulation means comprises transform means for converting said modulated signal into an analytic signal; and compensation means coupled to said transform means and responsive to said analytic signal, said compensation means for reducing distortion in said analytic signal, wherein said analytic signal contains said phase information; and display means coupled to said demodulation means for displaying said phase information in response to said compensated analytic signal to depict the phase information by a graphical representation on a display using said compensated analytic signal.

8. A real-time ultrasonic imaging apparatus comprising:

transmission means for transmitting and receiving ultrasonic sound, said transmission means generating a modulated signal in response to the received ultrasonic sound;

demodulation means for receiving said modulated signal and detecting phase information in said modulated signal, said demodulation means generating a phase information signal representing phase change in the spatial domain of said modulated signal, wherein said demodulation means comprises transform means for converting said modulated signal into an analytic signal; and shifting means coupled to said transform means and responsive to said analytic signal, said shifting means for shifting said analytic signal to an analytic baseband signal; and display means coupled to said demodulation means for displaying said phase information in response to said phase information signal.

9. The ultrasonic imaging apparatus as defined in claim 8 wherein said transform means performs a Hilbert transform.

10. The ultrasonic imaging apparatus as defined in claim 9 wherein said transform means comprises a complex bandpass finite impulse response digital filter.

11. The imaging apparatus defined in claim 8 wherein the demodulation means generates the phase information signal by generating a phase difference between successive samples of said modulated signal.

12. A real-time ultrasonic imaging apparatus comprising:

transmission means for transmitting and receiving ultrasonic sound, said transmission means generating a modulated signal in response to the received ultrasonic sound;

demodulation means for receiving said modulated signal and detecting phase information in said modulated signal, said demodulation means generating a phase information signal representing said phase information in said modulated signal, wherein said demodulation means comprises transform means for converting said modulated signal into an analytic signal;

shifting means coupled to said transform means and responsive to said analytic signal, wherein said shifting means comprises mixer means for shifting said analytic signal to an analytic baseband signal; and rotation means coupled to said mixer means and responsive to said analytic baseband signal, said rotation means for arbitrarily shifting the frequency of said analytic baseband signal; display means coupled to said demodulation means for displaying said phase information in response to said phase information signal.

13. The ultrasonic imaging apparatus as defined in claim 12 further comprising user interface means for controlling said rotation means, such that said baseband signal is shifted manually.

14. The ultrasonic imaging apparatus as defined by claim 12 wherein said mixer means comprises a mixer.

15. The ultrasonic imaging apparatus as defined in claim 12 wherein said rotation means comprises:

oscillator generation means for providing a tuning local oscillator, wherein said tuning oscillator is subject to phase and frequency modifications; and a rotator coupled to said oscillator for shifting said baseband signal in response to said phase and frequency modifications of said local oscillator.

16. A real-time ultrasonic imaging apparatus comprising:

transmission means for transmitting and receiving ultrasonic sound, said transmission means generating a modulated signal in response to the received ultrasonic sound, said modulated signal containing phase information;

transform means coupled to said transmission means for converting said modulated signal into an analytic signal;

compensation means coupled to said transform means and responsive to said analytic signal, said compensation means for minimizing distortion in said analytic signal, wherein said analytic signal contains said phase information to be displayed phase detection means coupled to said compensation means for receiving said analytic signal from said compensation means, said phase detection means for extracting said phase information along the path of said analytic signal and generating a phase information signal depicting said phase information; and display means coupled to said phase detection means for displaying said phase information is response to said phase information signal.

17. The ultrasonic imaging apparatus as detailed in claim 16 wherein said phase detection means comprises:

coordinate transform means for translating said analytic signal from rectangular coordinates to polar coordinates, such that the phase information for said analytic signal is extracted; and differential phase generation means for receiving said phase information from said coordinate transform means and determining the difference in said phase information between successive samples of said analytic signal, such that said display means displays said phase information difference.

18. The ultrasonic imaging apparatus as defined in claim 17 wherein said phase detection means further comprises phase discrimination means for receiving said phase information and placing said phase information difference to a predetermined value when said magnitude of said analytic signal is below a predetermined level.

19. The ultrasonic imaging apparatus as defined in claim 18 wherein said predetermined valve is zero, such that said phase discrimination means ignores said phase information when said magnitude as below a said predetermined level.

20. A real-time ultrasonic imaging apparatus comprising:

a receiver generating a modulated signal in response to received ultrasonic waves;

a demodulator coupled to the receiver to receive the modulated signal, when the demodulator comprises a baseband demodulation that convert the modulated signal into an analytic signal and a phase generator that performs phase and frequency equalization on the analytic signal and generates a phase information signal indicative of phase change in the spatial domain corresponding to the modulated signal in response to the analytic signal; and a display coupled to said demodulator for displaying said phase information in response to said phase information signal.

21. The apparatus defined in claim 20 wherein the demodulator uses a Hilbert transform to transform the modulated signal into the analytic signal.

22. A real-time ultrasonic imaging apparatus comprising:

a receiver generating a modulated signal in response to received ultrasonic waves;

a demodulator coupled to the receiver to receive the modulated signal and detect phase information in the modulated signal, wherein the demodulator converts the modulated signal into an analytic signal using an RF band digital Hilbert Transform and generates a phase information signal indicative of phase change in the spatial domain corresponding to the modulated signal in response to the analytic signal; and a display coupled to said demodulator for displaying said phase information in response to said phase information signal.

23. The apparatus defined in claim 22 wherein the demodulator comprises a finite impulse response filter to perform the Hilbert Transform.

24. The apparatus defined in claim 22 wherein the demodulator comprises an infinite impulse response filter to perform the Hilbert Transform.

25. A method for displaying information in an ultrasound system comprising the steps of:

generating a modulated signal in response to received ultrasound waves;

converting the modulated signal into an analytic signal;

generating a phase information signal from the analytic signal by generating a phase difference between successive samples of said modulated signal to represent phase change in the spatial domain of said modulated signal;

display a phase map containing phase information from the phase information signal.

26. The method defined in claim 25 further comprising the step of deriving amplitude and phase information from the analytic signal.

27. The method defined in claim 25 further comprising the step of extracting phase and amplitude information from the analytic signal using a digital coordinate transform, such that the analytic signal is transformed from rectangular to polar coordinates.

28. The method defined in claim 25 comprising the step of extracting phase and amplitude information from the analytic signal, wherein the phase information is extracted by generating the phase difference between successive samples of the modulated signal.

29. A real-time ultrasonic imaging apparatus comprising:

a receiver generating a modulated signal in response to received ultrasonic waves;

a demodulator coupled to the receiver to receive the modulated signal and generates an analytic signal in response to the modulated signal;

a phase generator coupled to the demodulator for generating a phase information signal indicative of phase information in the modulated signal in response to the analytic signal, and wherein the phase generator processes the phase information signal into phase map data illustrative of a phase difference between successive samples of said modulated signal; and a display coupled to said demodulator for displaying said phase information as a phase map in response to said phase map data.

30. A real-time ultrasonic imaging apparatus comprising:

a transmitter transmitting and receiving ultrasonic sound, said transmitter generating a modulated signal in response to the received ultrasonic sound, said modulated signal containing phase information;

a transformer coupled to said transmitter to convert said modulated signal into an analytic signal;

a compensator coupled to said transformer and responsive to said analytic signal, said compensator reducing distortion in said analytic signal, wherein said analytic signal contains said phase information;

a phase detector coupled to said compensator, said phase detector receiving said analytic signal from said compensator and extracting said phase information along the path of said analytic signal to generate a phase information signal depicting said phase information; and a display coupled to said phase detector, said display displaying said phase information is response to said phase information signal.

31. The ultrasonic imaging apparatus detailed in claim 30 wherein said phase detector comprises:

a coordinate transformer translating said analytic signal from rectangular coordinates to polar coordinates, such that the phase information for said analytic signal is extracted; and a differential phase generator receiving said phase information from said coordinate transform means and determining the difference in said phase information between successive samples of said analytic signal, such that said display displays said phase information difference.

32. The ultrasonic imaging apparatus defined in claim 31 wherein said phase detector further comprises phase discriminator to receive said phase information and to place said phase information difference to a predetermined value when said magnitude of said analytic signal is below a predetermined level.

33. The apparatus defined in claim 32 wherein the compensator minimizes distortion in said analytic signal.

* * * * *